United States Patent [19]
Rudick et al.

[11] Patent Number: 5,021,219
[45] Date of Patent: Jun. 4, 1991

[54] GAS GENERATOR FOR A CARBONATED DRINK DISPENSER

[75] Inventors: Arthur G. Rudick; Ashis S. Gupta, both of Marietta, Ga.

[73] Assignee: The Coca-Cola Company, Atlanta, Ga.

[21] Appl. No.: 281,219

[22] Filed: Dec. 8, 1988

[51] Int. Cl.⁵ .............................................. B01J 14/00
[52] U.S. Cl. .................................... 422/112; 422/236; 422/305; 222/129.2; 222/129.3; 222/129.4; 164/78; 99/323.1; 99/323.2
[58] Field of Search ...................... 422/236, 112, 305; 99/323.2, 323.1; 222/57, 61, 129.1, 129.2, 129.3, 129.4; 169/14, 15, 78

[56] References Cited
U.S. PATENT DOCUMENTS

| | | | |
|---|---|---|---|
| 186,089 | 1/1877 | Kayser | 422/112 |
| 2,736,466 | 2/1956 | Rodth | 222/129.2 |
| 3,350,176 | 10/1967 | Green et al. | 422/112 |
| 3,804,299 | 4/1974 | Kain | 222/61 |
| 4,479,918 | 10/1984 | Hoeppel | 422/112 |

Primary Examiner—David L. Lacey
Assistant Examiner—Abanti B. Singia
Attorney, Agent, or Firm—Birch, Stewart, Kolasch & Birch

[57] ABSTRACT

A chemical type $CO_2$ gas generator for a carbonated drink dispenser, which while embodied in several different implementations, commonly includes a first and a second liquid reagent container with the second reagent container including a reaction chamber for generating a carbonating gas when the two reagents are mixed. The containers are coupled so that the first reagent transfers from the first container to the reaction chamber of the second container when the pressure of the generated gas falls below a predetermined value.

16 Claims, 5 Drawing Sheets

GAS GENERATOR FOR A CARBONATED DRINK DISPENSER

BACKGROUND OF THE INVENTION

This invention relates generally to gas generator apparatus and more particularly to a $CO_2$ gas generator module which generates the gas by a chemical reaction.

A beverage dispenser which uses syrup and carbonated water to produce a carbonated beverage typically uses a pressurized cylinder containing $CO_2$ as part of the apparatus. Such systems, moreover, require complex controls to not only ensure the correct degree of carbonation, but also to provide a constant water pressure while dispensing. The latter is essential for providing proper control of the water-syrup dispensing ratio in a constant carbonation level while water is being drawn from either an on-board or external supply. Conventional $CO_2$ cylinders comprise heavy, high pressure containers which are necessarily returnable, refillable packages and which are not only cumbersome and inconvenient in use, but also require external control of pressure and safety devices for safe operation.

With the trend toward mini-sized and home type dispensers of carbonated soft drinks, there is a present need for a non-pressurized or low pressure $CO_2$ package inasmuch as it simplifies distribution through normal retail channels and provides greater convenience for the average user. Home dispensers are essentially relatively simple devices, with few controls, and in some instances, inserted in refrigerators, eliminating the need for separate cooling.

This in turn implies a need for a simple, disposable, yet durable $CO_2$ generator module where generation of the $CO_2$ gas occurs automatically with little or no user manipulation. Otherwise, the advantages of simplicity and cost effectiveness are counterbalanced by the lack of essential convenience.

SUMMARY OF THE INVENTION

Accordingly, it is an object of the present invention to provide an improvement in carbonation devices for a carbonated drink dispenser.

It is another object of the invention to provide an improved $CO_2$ generator for a drink dispenser.

It is a further object of the invention to provide a chemical type $CO_2$ generator which delivers $CO_2$ to a carbonator unit at substantially constant pressure.

It is yet another object of the invention to provide a fully automatic gas generator which is simple in construction and easy to use.

And it is still a further object of the invention to provide a disposable, plug-in type gas generator which operates at or near user pressure.

Briefly, the foregoing and other objects are realized by a self-regulating $CO_2$ generator module which in its broadest aspect comprises a first and a second liquid reagent container with the second reagent container including a reaction chamber for generating a carbonating gas when the two reagents are mixed. Means are coupled between the containers for causing the first reagent to transfer from the first container to the reaction chamber of the second container when the pressure of the generated gas falls below a predetermined value. In one specific embodiment the gas generator comprises a quick disconnect plug-in type module including a water and sodium bicarbonate storage chamber having a reaction chamber integral therewith and a liquid acid storage chamber with the acid storage chamber being at a relatively higher pressure than that of the reaction chamber, providing thereby a differential pressure. When the water and sodium bicarbonate are mixed with acid such as phosphoric acid, carbon dioxide is generated by the reaction resulting from the mixing of the reagents. A pressure regulator is coupled between the two chambers, causing the acid solution to be fed from the acid storage chamber into the reaction chamber when the pressure of the $CO_2$ gas therein falls below a predetermined value required for conventional carbonated drink dispensers. The $CO_2$ thus generated is then fed to a carbonator unit where it then is mixed with water to form carbonated water.

BRIEF DESCRIPTION OF THE DRAWINGS

The subject invention will be better understood when the following detailed description of the invention is considered in conjunction with the accompanying drawings in which.

DETAILED DESCRIPTION OF THE INVENTION

Figure 1:
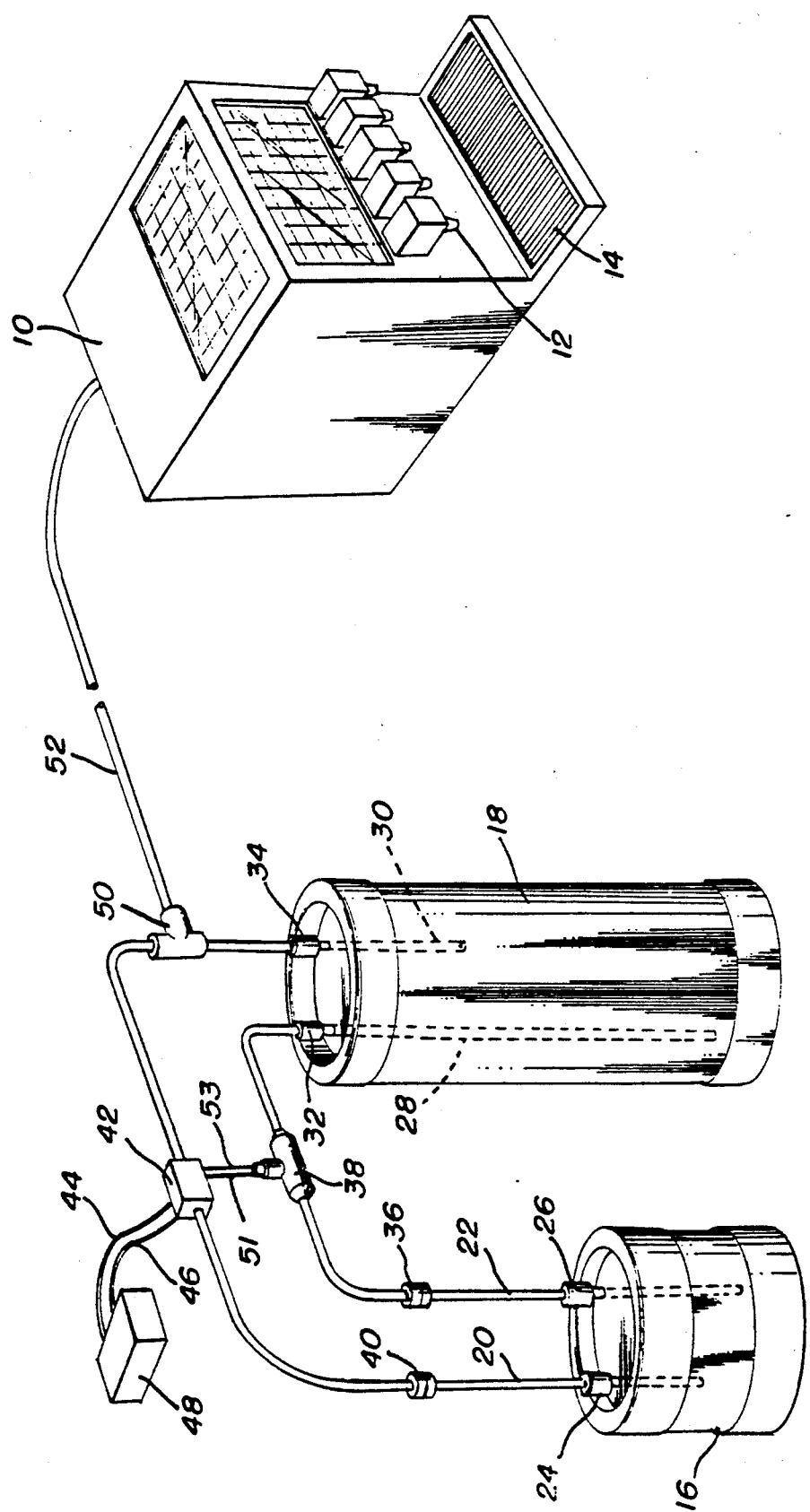
FIG. 1 is a perspective view of one embodiment of the invention.

Directing attention now to the drawings wherein like reference numerals refer to like parts throughout, reference is first made to FIG. 1 where there is shown a first embodiment of the invention. Reference numeral 10, for example, denotes a carbonated soft drink dispenser which includes a carbonator unit, not shown, wherein carbon dioxide ($CO_2$) is mixed with water to form carbonated water by the bubbling action of the $CO_2$ as it passes through the liquid. Carbonated water is then mixed with a quantity of syrup from a container, also mounted in the dispenser 10 where it is then applied to a dispensing port 12 located above an overflow and cup support tray 14.

The $CO_2$ generator as shown in FIG. 1 comprises, inter alia, a pair of generally cylindrical containers 16 and 18. The container 16 is relatively smaller than the container 18 by being relatively shorter in height while having substantially the same cross sectional diameter. Typically, the container 16 comprises a two gallon cannister while the container 18 comprises a five gallon cannister. Both containers 16 and 18 are constructed to withstand an operating pressure on the order of 125 psi. at room temperature. The materials from which the containers 16 and 18 are made are resistant to certain acid solution, for example, phosphoric acid.

A first pair of tubes 20 and 22 extend into the top portion of the container 16 through a respective pair of fittings 24 and 26. In the same manner, a second pair of tubes 28 and 30 extend into the top of the container 18 through fittings 32 and 34. The tubes 22 and 28 extend down into the respective containers 16 and 18 to near the bottom thereof while the tubes 20 and 30 reach only into the upper portion thereof which defines a respective headspace.

Further as shown in FIG. 1, the tubes 22 and 28 are connected together by means of a check valve 36 and an electrical solenoid valve 38. The upper end of the tube 20 extending into the container 16 terminates in a second check valve 40 which is connected to an electrical pressure sensor 42. The sensor 42 is connected by a pair of electrical leads 44 and 46 to an electrical power source 48 which may be, for example, a DC battery.

The other tube 30 extending upwardly from the container 18 terminates in a tee connector 50 which has one side connected to the pressure sensor 42 and the other side to a $CO_2$ delivery tube 52 which connects to the carbonator unit, not shown, of the dispenser 10. A pair of electrical leads 51 and 53 connect from the pressure sensor device 42 to the solenoid valve 38 for actuating the valve.

In operation, the container 16 is partially filled with approximately two gallons of, for example, a solution of phosphoric acid and is pressurized to approximately 100 psi. by carbon dioxide from an external system. Approximately one gallon of water is then poured into the container 18 followed by the addition of 42 pounds of, for example, sodium bicarbonate. The container 18 is then pressurized to approximately 70 psi. With all the mechanical connections, made, as shown in FIG. 1, a pressure differential will exist between the containers 16 and 18. The phosphoric acid solution will then flow from the container 16 into the container 18 via the tubes 22 and 28. The phosphoric acid enters the bottom of container 18 where it reacts with the sodium bicarbonate, causing carbon dioxide to be formed. As a result of the $CO_2$ generation, the pressure in the headspace at the top of the container 18 rises above 100 psi. At this point the pressure sensor 42, which is responsive to this magnitude of pressure, shuts off the solenoid valve 38 which in turn stops the flow of phosphoric acid into the container 18.

The gas generated within the container 18 is fed into the dispenser 10 via the tube 52. As more and more carbon dioxide is used in the dispensing apparatus 10, the pressure in container 18 will decrease and drop below 80 psi., for example. At that time the pressure sensor 42 opens the solenoid valve 38 and phosphoric acid will again be made to flow from the container 16 into the container 18. The headspaces of containers 16 and 18 are connected with a check valve 36 and 40, thus preventing the flow of gas from container 16 to container 18. Thus the container 16 always remains at approximately 100 psi. The pressure values are selectively chosen; however, when desirable, the pressure requirements may be reduced as will be shown in the subsequent embodiments depending upon the particular application.

When all the chemicals have been used up, the container 16 will be empty. The container 18, on the other hand, will contain a mixture of phosphates. The empty container 16 can be replenished when desired while the contents of the container 18 can be disposed of for use, for example, as a fertilizer.

When desirable, the solenoid valve 38, the check valve 36 and the section of tubing between the pressure sensor 42 and the tube 20 can be deleted by placing a pump in the lines 22 and 38 externally of the containers, whereupon the pressure sensor 42 operates to turn the pump on and off as necessary. In such a modification, the container 16 need not be a pressurized vessel and could be an open container or a bag-in-box type container if desired.

Figure 2B:
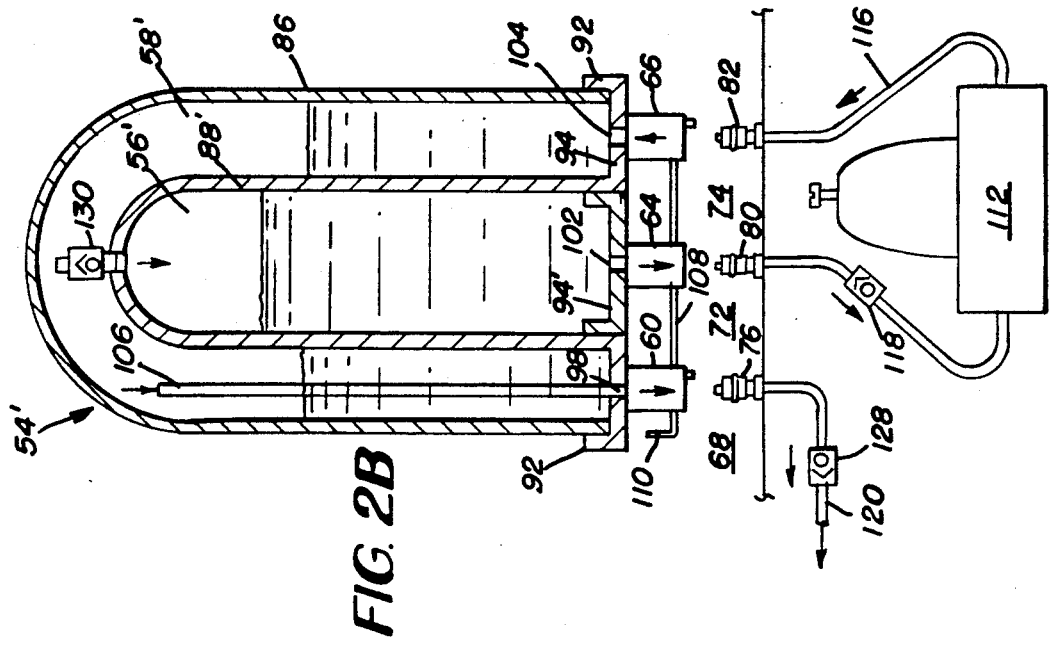
FIGS. 2A and 2B are mechanical schematic diagrams partly in section of another embodiment of the invention.
Figure 2A:
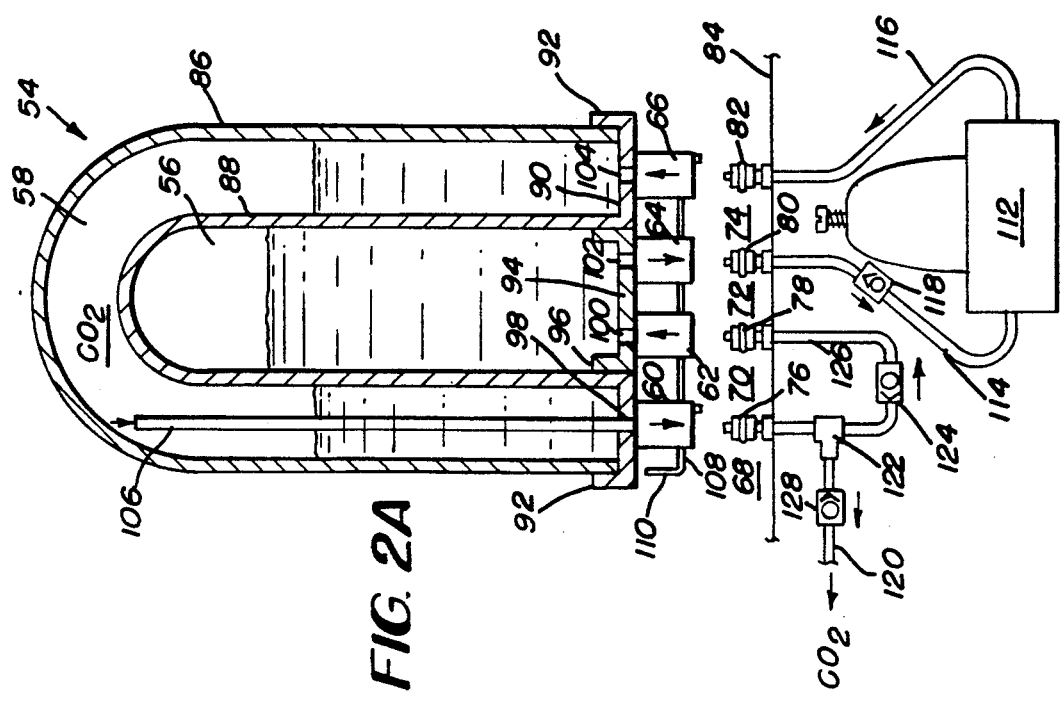

Another embodiment of a chemical $CO_2$ generator in accordance with this invention is shown in FIGS. 2A and 2B. The embodiment shown in FIG. 2A, for example, discloses a refillable chemical $CO_2$ generator in the form of an easily replaceable plug-in type module comprising a generally cylindrical bell type metal or plastic housing 54 which includes an inner chamber 56 containing, for example, a solution of phosphoric acid and a concentric outer chamber 58, containing water and sodium bicarbonate, which envelops the inner chamber 56. The housing 54, moreover, is rounded at the upper end and substantially flat on the bottom where there is located four female sections 60, 62, 64 and 66 of four quick-disconnect socket type fluid couplers 68, 70, 72 and 74 whose male sections 76, 78, 80 and 82 are fastened to a support surface 84 which may be located, for example, inside of a carbonated drink dispenser, not shown.

Further as shown in FIG. 2A, the housing includes an outer wall member 86 and an inner wall member 88. The inner wall member 88 includes a horizontal flat base member 90 which includes an upturned outer flange 92 which engages and is sealed against the lower bottom portion of the outer wall member 86. A circular inner flat base member 94 including upturned outer flange 96 is in contact with and is sealed against the bottom portion of the inner wall member 88. Four small openings or holes 98, 100, 102 and 104 are formed in the base members 90 and 94 and are in registration with the respective female connector portions 60, 62, 64 and 66.

A $CO_2$ output delivery tube 106 extends upwardly into the chamber 58 from the bore 98. A locking arm 108 extends between the connector portions 60, 62, 64 and 66 for locking the opposing connector elements 76, 78, 80 and 82 in place when the housing 54 is set in place on the support surface 84. A manual release of the connector element is provided by an angulated extension member 110 of the arm 108.

Further as shown in FIG. 2A, the inner chamber 56 is connected to the outer chamber 58 via a non-venting pressure regulator 112 which is connected between the male connector elements 80 and 82 by means of a pair of fluid conductor lines 114 and 116 and a check valve 118. The $CO_2$ output delivery tube 106 is coupled to a $CO_2$ output line 120 by means of a tee connector 122 connected to the male connector member 76. The tee connector 122 also couples back to the connector member 78 through a piece of tubing 126. Another check valve 128 is located in the output line 120 from the tee 122.

With respect to the operation of this embodiment, when the user initially obtains the module 54 and prior to its installation on the dispenser support surface 84, both the inner and outer chamber 56 and 58 are pressurized such that the pressure in the inner chamber 56 is greater than that in the outer chamber 58. If the regulator 112, for example, is designed or pre-set to 60 psi., the pressure within the acid solution chamber 56 is above 60 psi. and the pressure within the water and sodium bicarbonate mixing chamber is less than 60 psi. When the unit 54 is "plugged in", i.e. set into place, acid solution will flow from the inner chamber 56 into the outer chamber 58 which quickly reacts with the sodium bicarbonate to produce $CO_2$. In so doing, the pressure inside the outer chamber 58 rises. When the pressure in the outer chamber exceeds 60 psi., the regulator 112 operates to stop any further flow of acid and the pressure in the outer chamber will stabilize at some value slightly above 60 psi. As $CO_2$ is drawn from the outer chamber 58 via the tube 106, the pressure in the outer chamber 58 will subsequently fall below 60 psi. At that point the regulator 112 will then enable an additional amount of the acid solution in the inner chamber 56 to be fed into the outer chamber 58 where the cycle repeats itself.

When all of the acid solution has been transferred from the inner chamber 56 to the outer chamber 58, the module 54 is ready for replacement. Because the $CO_2$ at the top of the outer chamber 58 is connected to the inner chamber by way of the check valve 124, the pressure in the inner chamber 56 will always be greater than or equal to that of the outer chamber 58.

A modification of the embodiment shown in FIG. 2A is shown in FIG. 2B It is similar to the configuration of 2A with the exception that only three fluid line couplers are utilized in connection with a modified base on a bell housing 54'. The connectors include the connectors 68, 72 and 74. The deletion of the fourth connector as shown in FIG. 2A is accounted for by the inclusion of an internal check valve 130 between the inner chamber 56' and the outer chamber 58' at the top of the inner wall member 88'. It is identical in operation to the embodiment shown in FIG. 2A in that acid solution will flow from the inner chamber 56 to the outer chamber 58 through the regulator 112 until such time that pressure in the outer chamber 58, due to the generation of $CO_2$, equalizes that of the inner chamber 56 whereupon the regulator 112 prevents any further flow of acid solution into the outer chamber 58. When the pressure in the outer chamber 58 thereafter falls below 60 psi., acid solution from the inner chamber will again flow into the outer chamber.

The configuration of FIG. 2B is less desirable than that of FIG. 2A in .hat it suffers from an inherent weakness such that if the check valve 130 fails while the module 54' is being handled or shipped, the entire assembly could overpressurize and thus become subject to a catastrophic failure.

Figure 3:
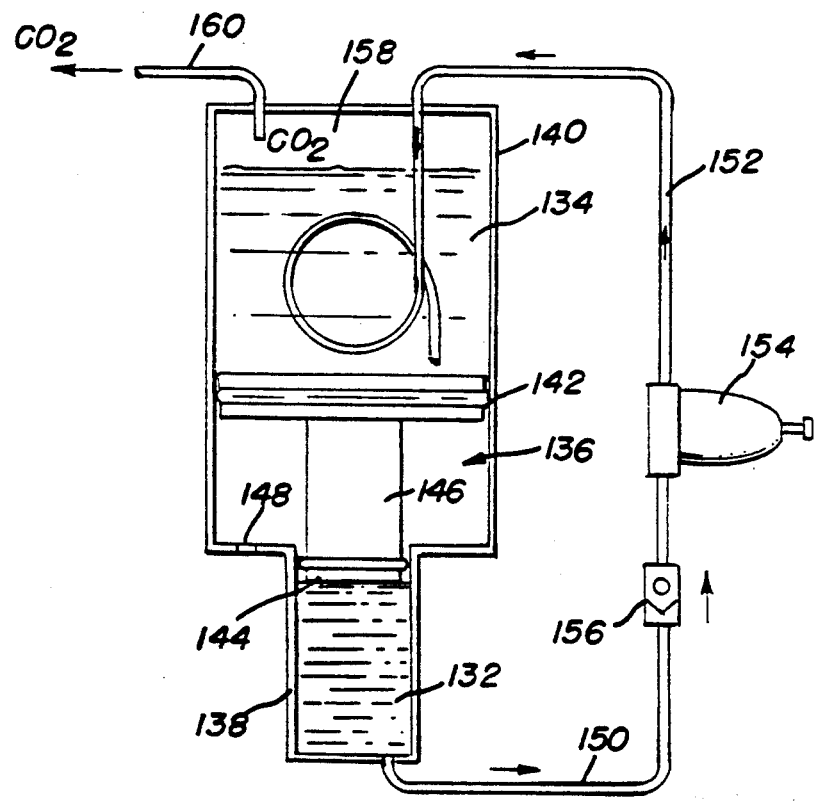
FIG. 3 is a mechanical schematic diagram illustrative of yet another embodiment of the invention.

Turning next to another embodiment of the invention, reference is now made to FIG. 3. Shown thereat is a $CO_2$ generator assembly including an acid solution chamber 132 separated from a reaction chamber 134 containing sodium bicarbonate and water by means of a double acting piston 136 located between two adjoining piston cylinders 138 and 140. The acid solution chamber 132 is defined by the outer end of the relatively smaller diameter piston cylinder 138 while the reaction chamber is defined by outer end of the larger diameter piston cylinder 140. A relatively larger piston head 142 slides within the cylinder 140 while a relatively smaller piston head 144 slides in the relatively smaller cylinder 138, with the two piston heads 1 2 and 144 being connected by a piston rod 146. A vent 148 is provided in the lower portion of the cylinder 140.

The lower acid chamber 132 which contains a solution of, for example, phosphoric acid, is coupled to the reaction chamber 134 by means of a pair of fluid lines 150 and 152, a regulator 154 set at, for example, 70 psi., and a check valve 156. It can further be seen that the upper fluid line 152 extends down into the sodium bicarbonate and water with a headspace 158 being provided at the top portion of the cylinder 140. The generated $CO_2$ accumulates in the headspace 158 where it is then fed to a carbonator unit of a carbonated soft drink dispenser, not shown, via the output line 160.

The configuration shown in FIG. 3 acts as a fluid pressure amplifier in that a 2:1 amplification factor, for example, can be obtained between the cylinders 138 and 140 due to the relative diameter differences therebetween. Thus where the pressure in the reaction chamber is 65 psi., the pressure in the acid chamber 132 would be 130 psi. This insures that the acid solution entering the regulator 154 is well above its set point, typically 70 psi. When the pressure in the reaction chamber exceeds 70 psi., the regulator operates to shut off the flow of the acid solution into the sodium bicarbonate and water solution in the reaction chamber 134; however, when the pressure drops below 70 psi., the regulator will then act to permit acid flow into the bottom of the reaction chamber as shown.

Figure 4:
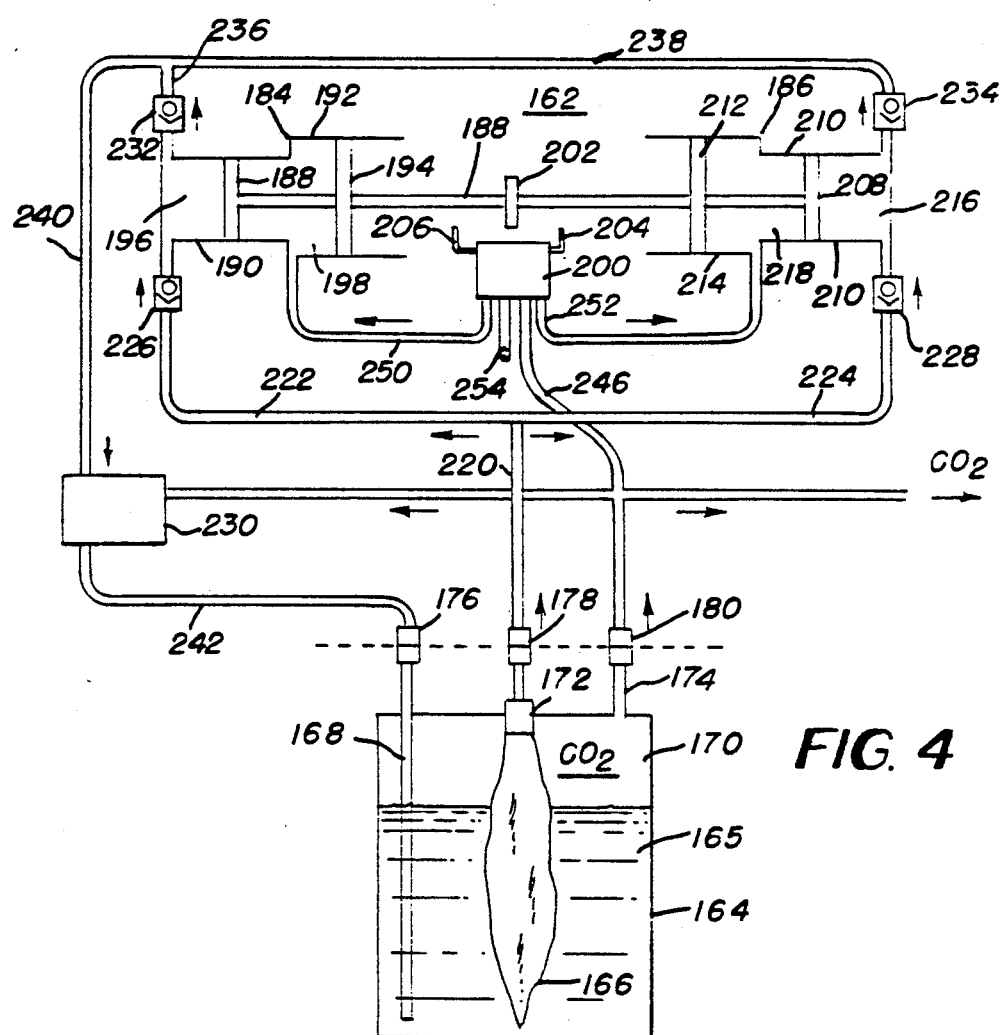
FIG. 4 is a mechanical schematic diagram of still another embodiment of the invention.

Turning attention now to FIG. 4, there is shown a schematic representation of a $CO_2$ generator system which incorporates an on-demand, bi-directional pump assembly 162 to feed an acid solution into a sodium bicarbonate and water reaction chamber. Pump 162 may be of the type disclosed in U.S. Pat. No. 4,436,493 to Credle, which issued March 13, 1984. As shown, reference numeral 164 denotes a replaceable unitized container module which includes a flexible bag 166 which is filled with an acid solution located within a volume 165 of sodium bicarbonate and water. An elongated tube 168 extends down into the container 164 for feeding acid solution into the bottom thereof, causing $CO_2$ to be generated from the resulting reaction and which is accumulated in the headspace 170 at the top of the container 164. In addition to the tube 168, a collar 172 is used to secure the bag 166 to the container. A $CO_2$ output line 174 is also provided at the top thereof. The elements 168, 172 and 174 furthermore are connected to quick disconnect fluid couplers 176, 178 and 180 and are similar to those shown in FIGS. 2A and 2B.

Control of the input of the acid solution into the volume of sodium bicarbonate and water is provided by means of the bi-directional pump 162. The pump 162 includes a pair of dual acting pistons 184 and 186 connected by a common piston rod 188. The piston 184 includes a relatively smaller piston head 188 located in a relatively small outer piston cylinder 190 which adjoins a relatively larger piston 192 containing a relatively larger inner piston head 194. Provided thereby is a compression chamber 196 for acid solution and an expansion chamber 198 for $CO_2$. $CO_2$ is fed thereto from a four-way valve device 200 which is actuated by a striker element 202 mounted on the center of the piston rod 188 between a pair of opposing actuating levers 204 and 206.

In a like manner, the piston 186 on the right side of the assembly includes a relatively smaller piston head 208 located in a relatively smaller outer cylindrical piston section 210, and a relatively larger piston head 212 located in an adjoining relatively larger inner piston cylinder 214. An acid solution compression chamber 216 is provided adjacent the piston head 208 while a $CO_2$ expansion chamber 218 is provided intermediate the piston heads 208 and 212.

Further as shown in FIG. 4, acid solution is fed from the flexible bag 166 via a fluid line 220 which splits into two directions including the lines 222 and 224 which operate to simultaneously feed the acid solution into both compression chambers 196 and 216 via check valves 226 and 228. Acid solution is alternately fed from the two compression chambers 196 and 216 to a pilot pressure actuated valve 230 by means of a pair of check valves 232 and 234 and the fluid lines 236, 238, 240. Acid solution is fed from he pilot pressure valve 230 by means of a fluid line 242 to the elongated feed tube 168 extending down into the volume 165 of sodium bicarbonate and water. The $CO_2$ generated in the container 164 is fed not only to an external carbonator unit, not shown, via the fluid line 244, but concurrently to the four way valve 200 by means of the fluid line 246 and to the pilot pressure valve 230 by means of the fluid line 248.

Accordingly, as $CO_2$ in the headspace 170 is fed to the valve 200, it alternately feeds $CO_2$ to the pump expansion chambers 198 and 218 via the fluid lines 250 and 252 coupled thereto. This action alternately pumps acid solution from the compression chambers 196 and 216 to the pilot pressure valve 230 due to the action of the striker 202 contacting either of the actuator members 204 or 206. The pump mechanism shown in FIG. 4 provides a slight pressure amplification to insure that the acid solution leaving the pump 162 from the compression chambers 196 and 216 will always be at a slightly higher pressure than the gas pressure in the head space 170 of the container 164. As long as the pressure inside the reaction chamber remains below 70 psi., the pilot actuated valve 230 will remain open, allowing acid to be pumped into the reaction chamber container 164 through the delivery tube 168.

Figures 5, 6:
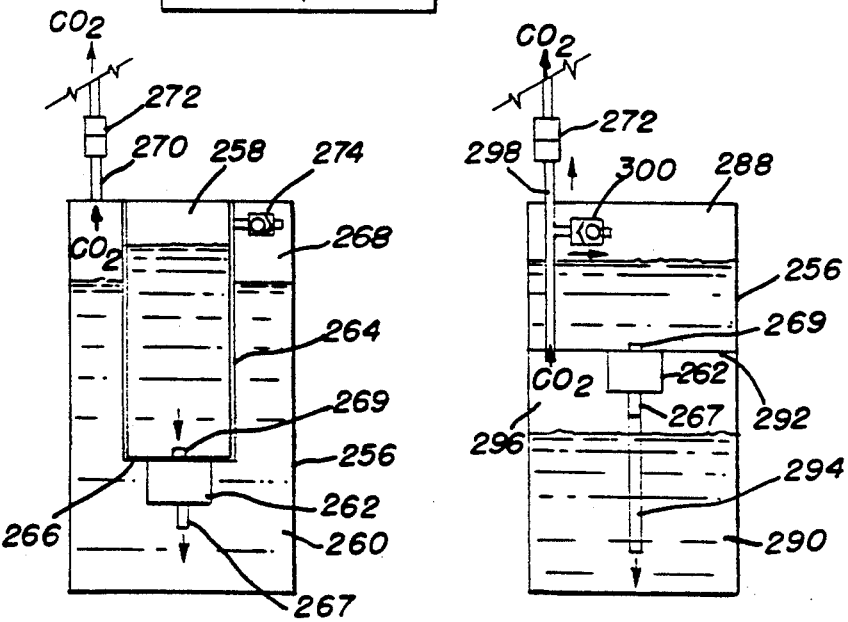

While several significantly different looking embodiments have been considered thus far, FIGS. 5, 6, 7 and 8 disclose further embodiments of the invention which are substantially like one another with respect to certain features yet are mutually different in other respects. Considering first the configuration in FIG. 5, shown thereat is a relatively simple structure of a chemical $CO_2$ generator module which is comprised of a container housing 256 which includes an inner acid solution chamber 258 and an outer sodium bicarbonate and water reaction chamber 260. In this regard it is similar to the configuration shown in FIGS. 2A and 2B but comprises an inverted version thereof and it further includes an internal pressure regulator mechanism 262, the details of which are shown in FIGS. 9A and 9B, and which will be considered subsequently.

The acid solution chamber 258 is defined by an elongated inner cylinder 264 centrally located within the housing 256. The pressure regulator 262 is secured to a transverse inside bottom wall 266 of the cylinder and acts to feed the acid into the bottom of the reaction chamber 260, causing $CO_2$ to be generated therein and accumulated in an upper annular headspace 268 and from which a $CO_2$ output line 270 extends. The output line 270 is joined to a simple quick disconnect coupler 272 for feeding $CO_2$ to a carbonator unit, not shown. A single check valve 274 is located at the top of the inner cylinder 264 to insure that the pressure in the inner acid containing chamber 258 will always be greater than or equal to that of the outer reaction chamber 260 and in this regard is similar to the embodiment shown in FIG. 2.

Figure 9A:
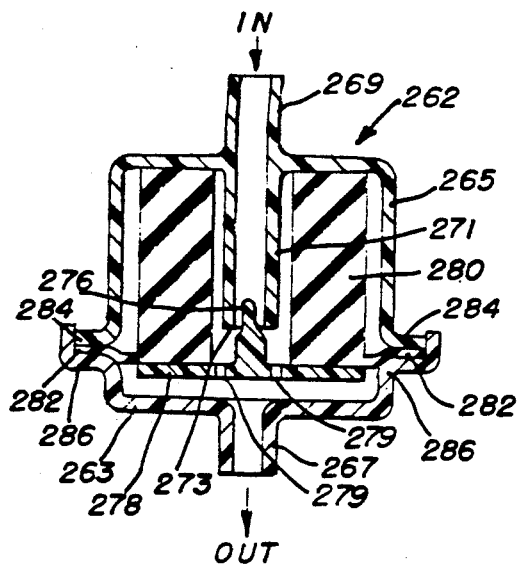
FIGS. 9A and 9B are central cross sectional views illustrative of an axial type pressure regulator utilized in conjunction with the embodiments shown in FIGS. 5 and 6.
Figure 9B:
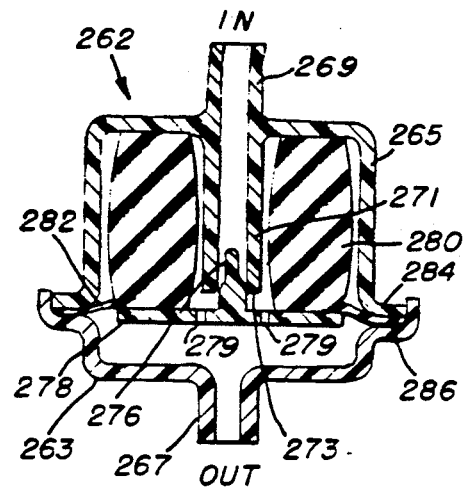

With respect to the regulator 262 shown in FIG. 5, it comprises a relatively simple, low cost device as shown in FIGS. 9A and 9B including a structure formed from molded plastic components, for example, and having a cap member 263 and a cup member 265 which additionally have coaxial outlet and inlet fittings 267 and 269 which extend outwardly in mutually opposite directions. The cup member 266, moreover, includes a tube portion 271 which extends inwardly from the inlet fitting 269. The inner end of the tube portion terminates in a valve seat 273 for a needle valve 276 which extends upwardly from a flat circular disk 278 having a plurality of pressure relief holes 279 located adjacent the needle valve 276. The disk 278 is secured to one end of a molded elastomeric spring member in the form of an annular diaphragm 280 which is positioned around the inlet tube portion 271 and which is bonded to the inside surface of the cup member 265. The spring member 280 additionally includes a relatively thin outwardly extending rim 282 which is positioned between the peripheral flanges of the cup 265 and cap 263 and which are joined together thereat to form a sealed enclosure.

It can be seen with reference to FIG. 9B that increased pressure on the outer side of the disk 278 caused by an increased pressure in the reaction chamber 260 (FIG. 5) from the generation of $CO_2$ causes the spring member 280 to compress and cause the needle valve member 276 to engage the seat 273 and thus shut off flow into inlet fitting 269 coupled into the acid containing chamber 258. During compression, acid within the cup 265 can escape through the relief holes 279. When the pressure in the reaction chamber 260 decreases due to a decrease of $CO_2$ therein, the spring member 280 springs back, causing the valve tip 276 to unseat and thus permit the flow of acid from the chamber 258 into the reaction chamber 260.

Referring now to the embodiment shown in FIG. 6, it includes a housing 256 as shown in FIG. 5 as well as the same pressure regulator 262; however, now the acid solution is contained in an upper chamber 288 while the reaction chamber 290 is located in the lower portion of the housing 256 with a horizontal transverse wall 292 thereacross separating the two chambers. The pressure regulator 262 is secured to the wall 292 with the inlet fitting 269 projecting into the chamber 288 while the outlet fitting 267 is now coupled to an elongated tube 294 which extends downwardly into the sodium bicarbonate and water contained in the chamber 290. The $CO_2$ generated accumulates in the upper headspace 296 of the mixing chamber 290. In order to feed the $CO_2$ generated to the quick disconnect coupling 272, another elongated tube 298 is inserted through the acid solution containing the chamber 288 into the top portion of the reaction chamber 290 as shown. Additionally, a check valve 300 similar to the check valve 274 shown in FIG. 5, is coupled to the tube 298 to insure that the pressure in the chamber 288 will be equal to or greater than that of the reaction chamber 290.

Figures 7, 8:
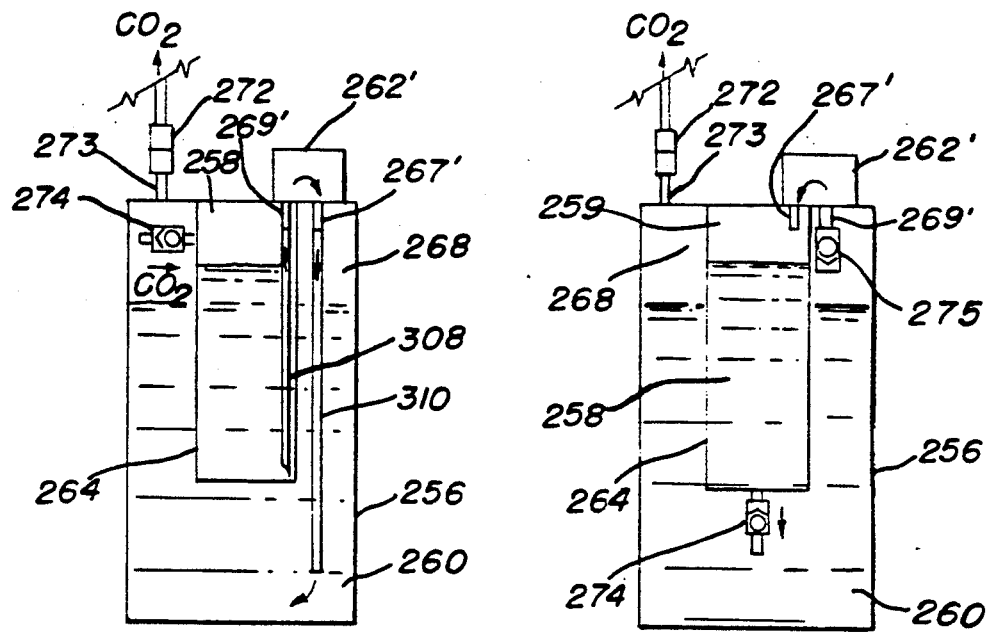
FIGS. 5 through 8 are mechanical schematic diagrams of further embodiments of the invention.

Next, FIG. 7 discloses an embodiment similar to that shown in FIG. 5 with the exception that a second embodiment of a pressure regulator is used in connection therewith. As shown in FIG. 7, this regulator is identified by reference numeral 262' and comprises a structure which is shown in detail in FIGS. 10A and 10B. The regulator 262' is similar to the regulator 262 shown in FIGS. 9A and 9B but it now includes a modified cap 263' and cup 265'. The cup 265' lacks the inlet fitting 269; however, the cap member 263' includes both the outlet and inlet fittings 267' and 269' adjacent one another on the same side of the device. The pin type valve mechanism is also modified in that a valve stem 302 now depends downwardly from the disk 278' attached to the spring member 280. Further, the stem includes a head 303 which engages a valve seat 304 formed in the flat surface portion 306 of the cap member 263'.

The operation of the regulator 262' is such that increased pressure on the disk 278' due to the increase of $CO_2$ in the reaction chamber 268 (FIG. 7) draws the valve stem 302 upward by the action of the spring member 280, whereupon the valve stem engages the valve seat 304, shutting off the supply of acid solution into the reaction chamber as previously described.

With the pressure regulator 262' being located, for example, on top of the housing 256, a pair of extension tubes 308 and 310 are attached to the input and output fittings 269' and 267', respectively, so that they extend downwardly into the bottom of the chambers 258 and 260.

A modification of the embodiment shown in FIG. 7 is illustrated in FIG. 8 and involves locating the check valve 274 in the sodium bicarbonate and water solution in the reaction chamber 260 by placing it at the bottom of the inner cylinder 264 and attaching a second check valve 275 to the fitting 269'.

The pressure in the acid chamber 258 starts out at 70 psi. The pressure in the reaction chamber 260 starts out at 70 psi or slightly above. As some $CO_2$ is drawn from the reaction chamber 260 through the pressure output tube 273, the pressure in the reaction chamber 260 drops below the pressure in the acid chamber 258. Some acid flows through the check valve 274 at the bottom of the acid chamber 258 until the pressure in the reaction chamber 260 exceeds the pressure in the acid chamber 258, shutting off the flow. Due to overshoot, the pressure in the reaction chamber 260 will continue to increase until it is back up slightly above 70 psi. The check valve 275 attached to the regulator inlet insures that $CO_2$ will flow only from the reaction chamber head space 268 to the acid chamber head space 259. The regulator 262' is set to 70 psi. Whenever the pressure in the acid chamber 258 drops below 70 psi, the regulator 262' opens up to allow the overshoot from the reaction chamber 260 to repressurize the acid chamber 258 back up to 70 psi at which point the regulator 262' closes off the gas flow, with the pressure in the acid chamber 258 equal to 70 psi and the pressure in the reaction chamber 260 slightly above 70 psi.

Figure 10A:
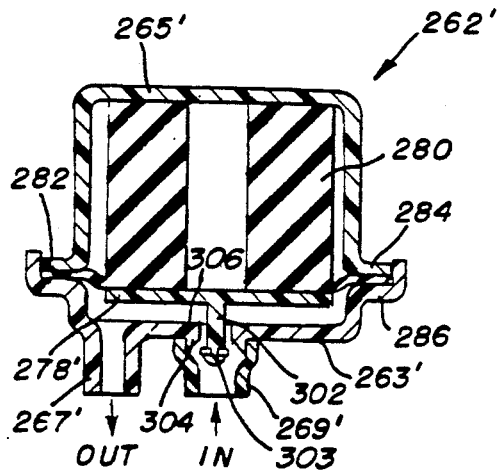
FIGS. 10A and 10B are cross sectional views illustrative of another type of pressure regulator device utilized in connection with the embodiments shown in FIGS. 7 and 8.
Figure 10B:
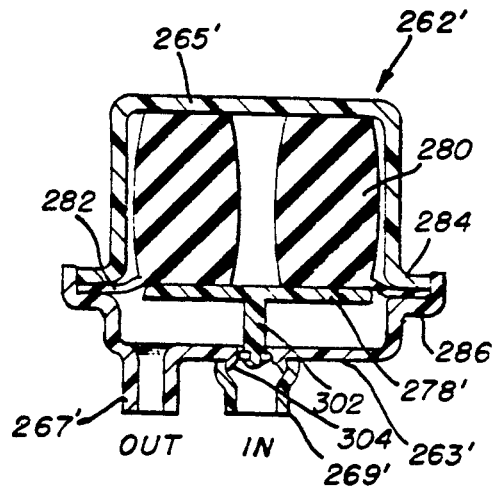
Figure 11:
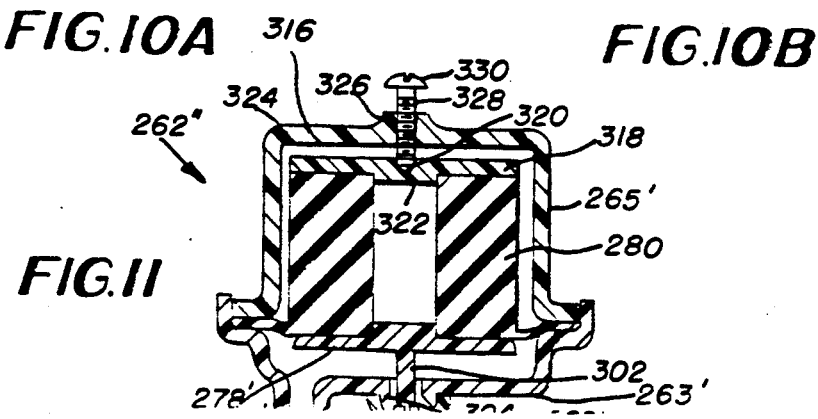
FIG. 11 is a cross sectional view of a modification of the pressure regulator shown in FIGS. 10A and 10B.

A modified form of the pressure regulator 262' as shown in FIGS. 10A and 10B is disclosed in FIG. 11 and involves a substantially identical structure to that shown thereat with the exception that it now includes means for varying the set point, i.e. the pressure at which the valve mechanism opens and closes. As shown in FIG. 11, the spring member 280 is no longer attached to the inside wall surface 316 of the cup member 265', but is now secured to a circular disk 318 which is similar to the disk 278' which includes the valve stem. The disk 318, however, includes a screw receiving recess 320 in the upper surface thereof, and a raised portion 322 which fits down into the center of the annular spring member 280. The top wall 324 of the cup member 265' additionally includes a shoulder 326 through which a threaded bore 328 is formed. A conventional screw 330 is threaded into the bore 328 where the tip thereof contacts the recess 320. The turning of the screw 330 varies the amount of compression of the spring member 280 in absence of any pressure exerted on the plate 278'. Thus the set point becomes manually adjustable within a predefined range of pressures required for proper operation of the dispenser, not shown, and with which the embodiments shown in FIGS. 7 and 8 are utilized.

Thus what has been shown and described are several different configurations of a disposable $CO_2$ generator module which can be utilized in connection with a carbonated drink dispenser and being operable to chemically generate $CO_2$ in a relatively simple manner. This apparatus can be utilized for a dispenser for home use and/or where there is a requirement for equipment which can be handled by relatively inexperienced users.

While the acid reagent has been described as being typically comprised of phosphoric acid, it should be noted that, when desirable, citric acid, nitric acid, or hydrochloric acid may be utilized in certain applications. With respect to the other reagent used in combination with water, while sodium bicarbonate is normally preferred, calcium carbonate could also be utilized, when desired.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:

1. Self-regulating gas generator apparatus for producing a carbonating gas utilized in a carbonated drink dispenser and which generates the gas by a chemical reaction comprising:

first container means for holding a first chemical reagent utilized in generating a carbonating gas for the drink dispenser;

second container means for holding a second chemical reagent utilized in generating a carbonating gas for the drink dispenser, a reaction chamber integral with said second container means for generating a carbonating gas for the drink dispenser when said first and second reagents are mixed;

said first and second container means respectively comprising a pressurized centralized inner chamber and an adjoining outer annular chamber located within a common housing, wherein pressure in the inner chamber is initially greater than the pressure in the outer chamber and wherein the pressure in the outer chamber increases due to gas generation therein, means coupled between said inner and outer chambers for controlling the transfer of said first reagent from said inner chamber to said outer chamber, said means for controlling the transfer of reagent between said inner and outer chambers comprising means responsive to a pressure differential between said chambers to enable reagent flow therebetween to effect gas generation when the pressure in said inner chamber is greater than the pressure in said outer chamber and the pressure in said outer chamber drops below a preset value and to inhibit reagent flow when the pressure in the outer chamber is equal to that of said inner chamber and further when the pressure in said outer chamber is greater than that of the inner chamber, discharge means for feeding the generated carbonating gas from said second container means to a drink dispenser, said common housing for said inner and outer chamber further including a generally flat base region constructed for mounting a support surface of the drink dispenser and including openings therein to the inner and outer chambers, and additionally including fluid coupling means intermediate said openings and said pressure responsive means and said discharge means.

2. The apparatus as defined by claim 1 wherein said first and second container means comprise liquid container means and said chemical reagents comprise liquid reagents.

3. The apparatus as defined by claim 2 wherein said first reagent comprises an acid solution and said second reagent comprises a mixture of a chemical carbonate and water.

4. The apparatus as defined by claim 1 wherein said inner chamber comprises a chamber for storing an acid solution and wherein said outer chamber comprises a chamber for storing a solution of chemical carbonate and water.

5. The apparatus as defined by claim 1 wherein said pressure responsive means and said discharge means comprises a fluid regulator and a gas line, respectively, mounted on said support surface and wherein said fluid coupling means comprise a plurality of socket type couplers respectively coupling said openings to said fluid regulator and said gas line, forming thereby a quick disconnect plug-in module.

6. The apparatus as defined by claim 5 wherein said common housing comprises a bell type housing having substantially parallel inner and outer wall members and wherein said inner wall is shared by said inner and outer chambers.

7. Self-regulating as generator apparatus for producing a carbonating gas utilized in a carbonated drink dispenser and which generates the gas by a chemical reaction comprising:

first container means for holding a first chemical reagent utilized in generating a carbonating gas for a drink dispenser;

second container means for holding a second chemical reagent utilized in generating a carbonating gas for the drink dispenser;

a reaction chamber integral with said second container means for generating a carbonating gas for the drink dispenser when said first and second reagents are mixed;

said first and second liquid container means comprising outer end portions of a double acting piston assembly including a pair of adjoining piston cylinders having respective piston head members located therein and joined together by a common piston rod whereby expansion in one piston cylinder is accompanied by compression in the other piston cylinder, means coupled between said outer end portions of said piston assembly for controlling the transfer of said first reagent from said first container means to said second container means when the pressure of the generated carbonating gas falls below a predetermined value; and discharge means for feeding the generated carbonating gas from one of said outer end portions to the drink dispenser.

8. The apparatus as defined by claim 7 wherein one of said piston cylinders is large in diameter than the other piston cylinder.

9. The apparatus as defined by claim 8 wherein the outer end portion of the larger piston cylinder comprises said second container means and wherein the outer end portion of the smaller piston cylinder comprises said first container means.

10. The apparatus as defined by claim 9 wherein said first reagent comprises an acid solution and said second reagent comprises a mixture of a chemical carbonate and water.

11. Self-regulating gas generator apparatus for producing a carbonating gas utilized in a carbonated drink dispenser and which generates the gas by a chemical reaction comprising:

first container means for holding a first chemical reagent utilized in generating a carbonating gas for a drink dispenser;

second container means for holding a second chemical reagent utilized in generating a carbonating gas for the drink dispenser;

a reaction chamber integral with said second container means for generating a carbonating gas for the drink dispenser when said first and second reagents are mixed;

said first container means comprising a flexible inner container means including a liquid first reagent and being located in a liquid volume of second reagent contained in said second container means, said second container means comprising an outer container means, means coupled between said first and second container means for controlling the transfer of said first reagent from said first container means to said second container means when the pressure of the generated carbonating gas falls below a predetermined value, said means for controlling the transfer reagent comprising a pump coupled to said flexible container means of said first container means and driven by the gas generated in the reaction chamber of said second container means, said pump constructed so as to raise the pressure of said first reagent;

valve means coupled between said pump and said second container means and being responsive to the pressure differential between the raised pressure of said first reagent and the gas generated in the reaction chamber of said second container means to transfer said first reagent to said second container when the pressure of the generated gas falls below said raised pressure of said first reagent; and discharge means for feeding the generated carbonating gas from said second container means to the drink dispenser.

12. The apparatus as defined by claim 11 wherein said first reagent comprises an acid solution and said second reagent comprises a mixture of a chemical carbonate and water.

13. The apparatus as defined by claim 11 wherein said pump comprises a pump assembly including a pair of opposing double acting pistons connected by a common piston rod and wherein each of said pistons include a pair of adjoining piston cylinders having respective piston head members located therein and wherein said first reagent is fed to the outer end portions thereof and said generated gas is fed to the space between the piston head members, whereby expansion of generated gas in one of said pistons is accompanied by compression of said first reagent in the outer end portion of the other of said pair of pistons.

14. The apparatus as defined by claim 11 wherein said flexible container means comprises a bag.

15. Self-regulating gas generator apparatus for producing a carbonating gas utilized in a carbonated drink dispenser and which generates the gas by a chemical reaction comprising:

first pressurized container means for holding a first chemical reagent utilized in generating a carbonating gas for a drink dispenser;

second pressurized container means for holding a second chemical reagent utilized in generating a carbonating gas for the drink dispenser;

a reaction chamber integral with said second container means for generating a carbonating gas for the drink dispenser when said first and second reagents are mixed;

said first and second container means comprising a pair of adjoining mutually coaxial cylindrical members having at least one common wall therebetween, wherein said first container means comprises an inner container member and said second container means comprises a larger outer container member and wherein pressure in the inner container member is initially greater than the pressure in said outer container member and wherein the pressure in the outer container member increases due to gas generation therein, means including a pressure regulator located interiorally of the outer container member and coupled between said inner and outer container members for controlling the transfer of said first reagent from said inner container member to said outer container member, said pressure regulator being responsive to a pressure differential between said container members to enable reagent flow therebetween to effect gas generation when the pressure in said inner container member is greater than the pressure in said outer container member and the pressure in said outer container member drops below a preset value and to inhibit reagent flow when the pressure in the outer container member is equal to that of said inner container member and further when the pressure in said outer container member is greater than that of said inner container member, and discharge means for feeding the generated carbonating gas from said second container means to the drink dispenser.

16. The apparatus as defined by claim 15 wherein said pressure regulator is located on a lower portion of said first container means.

* * * * *